United States Patent [19]

Carmichael

[11] 3,875,725

[45] Apr. 8, 1975

[54] PROCESS FOR CAPPING LIGHT-WEIGHT THERMOPLASTIC BOTTLES

[75] Inventor: Keith Stewart Carmichael, Wilmington, Del.

[73] Assignee: E. I. du Pont de Nemours and Company, Wilmington, Del.

[22] Filed: Mar. 14, 1973

[21] Appl. No.: 341,247

[52] U.S. Cl. .......................... 53/38; 53/300; 53/368
[51] Int. Cl. .............................................. B65b 7/28
[58] Field of Search .......... 53/42, 38, 300, 368, 40, 53/43, 329, 367, 201, 324, 328

[56] References Cited
UNITED STATES PATENTS

| | | | |
|---|---|---|---|
| 1,912,677 | 6/1933 | Williams | 53/300 |
| 3,432,989 | 3/1969 | Bouzereau | 53/300 X |
| 3,499,567 | 3/1970 | Spotts | 53/42 X |
| 3,657,859 | 4/1972 | Smithers | 53/300 UX |

FOREIGN PATENTS OR APPLICATIONS

| | | | |
|---|---|---|---|
| 72.25632 | 2/1973 | France | 53/42 |

*Primary Examiner*—Travis S. McGehee
*Assistant Examiner*—Horace M. Culver

[57] ABSTRACT

A process for capping a resilient thermoplastic bottle wherein the bottle has a rigid capping portion with an annular ring of thermoplastic material immediately below the cappable portion of the bottle, said process comprising placing the bottle on a bottle carrier in registration with a bottle-capping device, positioning a support device immediately below the annular ring of thermoplastic material on the bottle with a clearance gap between the support device and the annular ring of thermoplastic material, applying a cap to the cappable portion of the bottle using an axial compressive capping force wherein the resilient thermoplastic bottle deflects against the bottle carrier with enough deflection to close the clearance gap between the bottle support device and the annular support ring of thermoplastic on the bottle absorbing a portion of the axial capping force whereupon the bottle support device absorbs the remaining capping force.

4 Claims, 4 Drawing Figures

PROCESS FOR CAPPING LIGHT-WEIGHT THERMOPLASTIC BOTTLES

BACKGROUND OF THE INVENTION

This invention relates to a process for capping a light-weight, resilient thermoplastic bottle.

Thermoplastic bottles, particularly those used to bottle liquids under pressure, must be very tightly sealed in order to contain the autogenous pressure in the bottle. Sealing the bottle is conventionally accomplished by placing a crown cap or a pilfer-proof cap on the bottle. The cap is sealed on the bottle by exerting a relatively large compressive axial force against the cap forcing the cap onto the bottle.

When capping a very sturdy thermoplastic bottle, usually heavy in weight and having a relatively thick shell section, the bottle is strong enough to withstand the capping loads. However, for economic reasons, it is desirable to use less thermoplastic in making the bottle, resulting in a light-weight and relatively thin-shelled bottle. The lighter the weight and the thinner the shell, the greater the likelihood that the bottle will not be able to withstand the capping force required to place a cap on the bottle. Typically light-weight bottles fail under the axial compressive capping load by buckling from insufficient column strength in the shell of the bottle.

The prior art teaches the use of means for grasping the neck of the bottle immediately below the cappable portion of the bottle, means to lift the bottle from its base support, and means to cap the bottle while the bottle is totally supported by the neck-gripping means. This limits the capping forces to that portion of the bottle above the gripping means thereby preventing buckling loads from being imposed on and crushing the bottle.

While this prior art may be satisfactory in use, it has one significant disadvantage. This disadvantage is the fact that the bottle must be picked up from its base support during capping and replaced to the base support after capping. This is necessary to accommodate practical variations in bottle height and to prevent stressing of the body and the bottom of nonresilient bottles. It adds substantially to capping machine complexity and cost. It is desirable, therefore, to find a method of capping relatively light-weight and thin-shelled plastic bottles without having to pick the bottle up during capping and replacing the bottle to its base support after capping.

DETAILS OF THE INVENTION

Bottles useful in the process of the present invention are light-weight, thin-shelled thermoplastic bottles. The bottles also have a rigid capping portion and a resilient body or bottom portion. The resilient portion of the bottle must be capable of being deflected under an axial compressive capping load and return to its undeflected shape after the capping load is removed.

In addition, the bottle is made with an annular support ring of thermoplastic material immediately below the cappable portion of the bottle.

Figure 1:
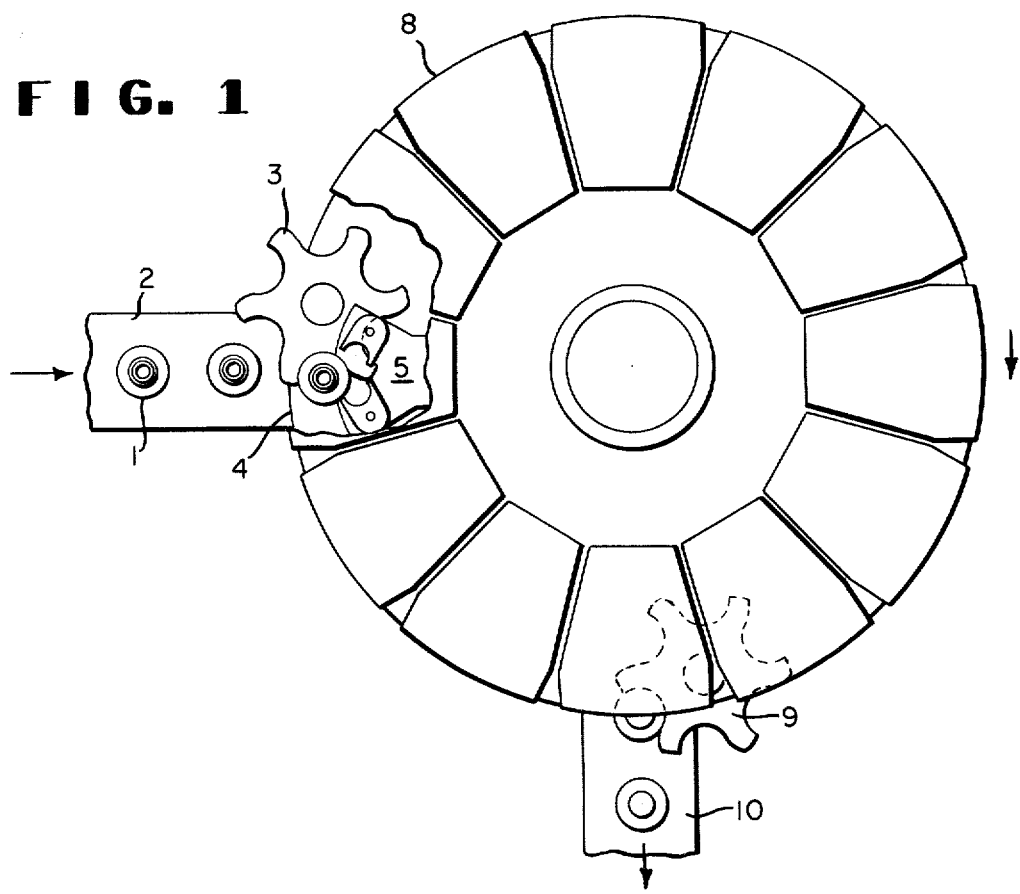
FIG. 1 shows a plan view of a conventional carousel bottle-capping apparatus.

The process of this invention will be described in relation to the drawings. FIG. 1 shows a plan view of a carousel-type capping apparatus. Filled and uncapped bottles 1 are carried by a moving conveyor 2 into a starwheel 3 which places the bottles on a bottle carrier 4 in registration with a bottle capping device 5.

Figure 2:
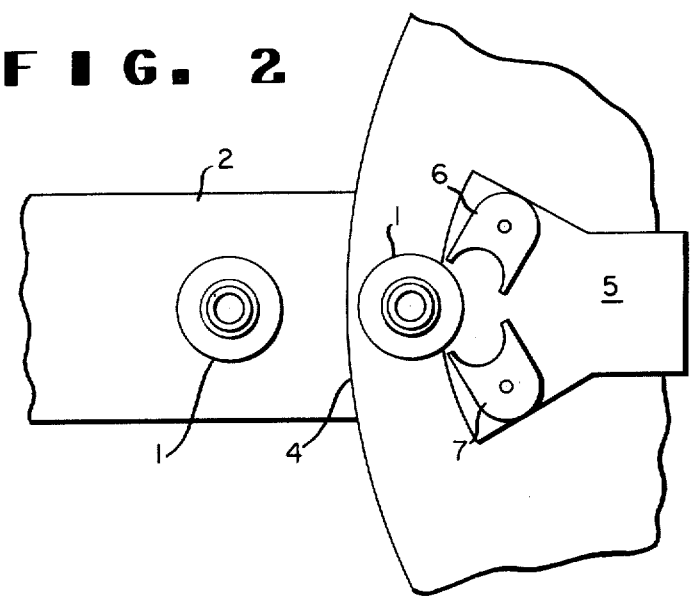
FIG. 2 shows a detailed section of a bottle support device.

Referring to FIG. 2, a bottle support means used to support the bottle being capped is comprised of a plate 5 supporting two opposing jaws 6 and 7 which are cammed to the open position to receive a bottle and cammed to the closing position after the bottle is received.

Once the bottle is positioned between clamping jaws 6 and 7, the bottles rotate in the carousel while capping is performed by conventional capping heads 8. After capping, the bottles are discharged by a starwheel 9 which grips the bottle and simultaneously feeds the bottle onto a take-off conveyor 10.

Figure 3:
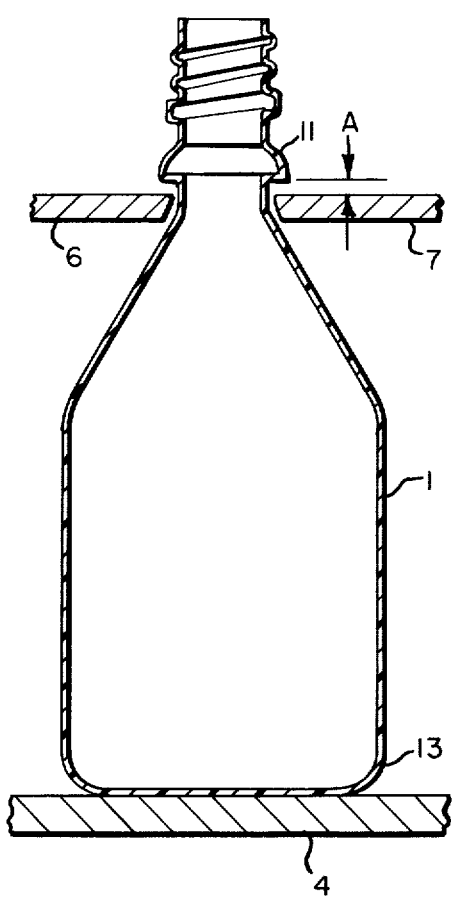
FIG. 3 shows a profile view of a bottle placed within the gripping means prior to capping.

Referring to FIG. 3, when the bottle is accepted between clamping jaws 6 and 7, a reinforcing ring 11 on the bottle is positioned away from the clamping jaws by a clearance marked A. This clearance typically is about 40 to 60 mils. The clearance is necessary because it is very difficult to have the reinforcing ring on every bottle a given fixed distance from the base of the bottle. Therefore, a tolerance is necessary to allow for minor discrepancies in the dimension between the bottom of the bottle and the reinforcing ring.

As the bottle in the clamping jaws rotates in the capping carousel, a cap 12 is placed on the bottle and an axial compressive load applied to seal the cap to the bottle.

Figure 4:
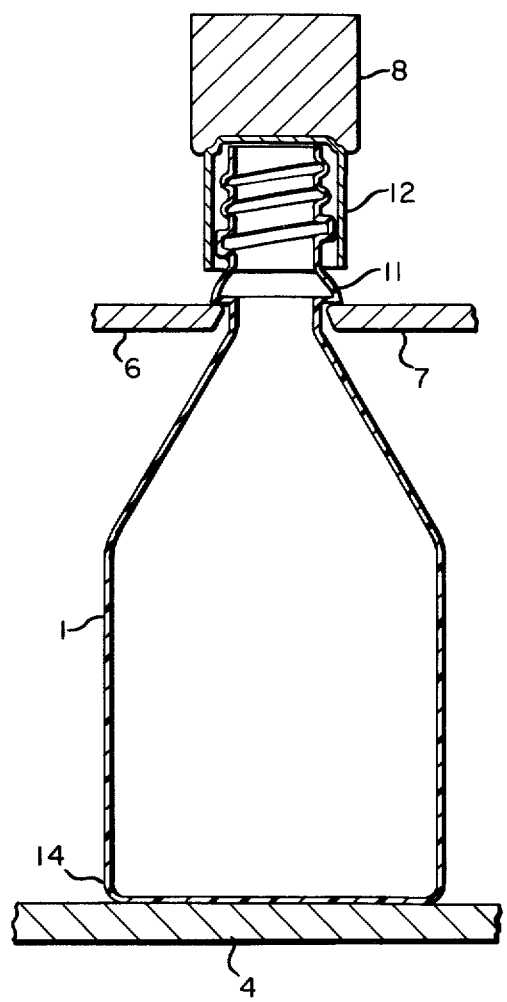
FIG. 4 shows a profile view of a bottle being capped and subjected to an axial compressive capping load while being held at the bottle-reinforcing ring immediately below the cappable portion of the bottle by the bottle support device.

During the application of the compressive capping load, as shown in FIG. 4, the body of the bottle between the base and the reinforcing ring, being resilient, deflects 60 mils or an amount sufficient to take up the clearance dimension A and seat the reinforcing ring 11 against clamping jaws 6 and 7. The bottle, therefore, accepts part of the compressive load while the remaining compressive load is taken up by the clamping jaws 6 and 7.

When the compressive capping load is applied, the main body or the bottom of the bottle or both must deflect an amount equivalent to clearance gap A. In the drawings, this deflection is taken up primarily by a deflection in the bottom of the bottle. This can be seen by comparing the long, round curve 13 shown in the undeflected bottle of FIG. 3 before the capping force is applied versus the same bottle in FIG. 4 with the compressive capping force applied to flatten out curve 13 into a short but still curved section 14 which reflects the deflection necessary in the bottle to absorb the force used to close clearance gap A. After the compressive capping force is removed, the bottle and particularly curve 14 will return to the original or nearly the same original configuration of the initial bottle.

It is difficult to predict exactly where the deflection will take place; however, with the proper degree of resilience in the thermoplastic used to make the bottle, this fact will not be critical since the capped bottle will have the same geometric shape as the original starting uncapped bottle.

Two elements are particularly important to the process of the present invention. First, to aid in preventing jamming of the bottles in the capping operation, clearance A should be sufficient to accommodate the variations in bottle heights encountered in practice. This variation is typically about 0 to 40 mils for bottles used in bottling beer or soft drinks having a fluid content of about 6 to 16 ounces. Therefore, a clearance gap of about 40 to 60 mils has been found effective in use. Second, the resiliency of the bottle must permit elastic recovery of the deflection incurred during capping.

In this manner, very light-weight, thin-shelled thermo-plastic bottles can be capped with high compressive capping forces necessary to properly apply the cap without crushing the bottle.

Bottles useful in this invention can be prepared from thermoplastic materials including polyethylene terephthalate, polyethylene, polypropylene, polyvinyl chloride, copolymers of acrylonitrile/styrene/acrylate, acrylonitrile/methacrylate, methacrylonitrile copolymers, polycarbonates, polybis(paraaminocyclohexyl)-dodecaneamide and other polyamides, and polyformaldehyde.

The bottle so produced should have a reinforcing ring immediately below the cappable portion of the bottle. This reinforcing ring is designed to be positioned a small tolerance or clearance above the clamping jaws which will close beneath the reinforcing ring and partially support the bottle during capping.

The bottles typically contemplated by the application of this invention are soda bottles and beer bottles. These bottles typically contain relatively high autogenous pressures and therefore an excellent seal is required between the cap on the bottle and the bottle itself.

I claim:

1. A process for capping a resilient thermoplastic bottle having a rigid capping portion and an annular support ring immediately below the capping portion, said process consisting essentially of:
    a. placing the bottle on a bottle carrier in registration with a bottle-capping device;
    b. positioning a support device below the bottle annular support ring with a clearance gap between the support device and the support ring; and, without removing the bottle from the bottle carrier,
    c. applying a cap to the cappable portion of the bottle using an axial compressive capping force, whereby the bottle deflects against the bottle carrier to close the gap between the support device and the bottle support ring and absorbs a portion of the axial capping force, whereupon the support device absorbs the remaining axial capping force; and
    d. removing the capped bottle from the capping device, whereupon the bottle returns to substantially its original configuration.

2. The process of claim 1 wherein bottles are automatically and continuously placed in registration with the bottle capping device.

3. The process of claim 1 wherein the support device is positioned about 40 to 60 mils below the bottle support ring.

4. The process of claim 1 wherein the thermoplastic bottle is a polyethylene terephthalate bottle.

* * * * *